No. 830,555. PATENTED SEPT. 11, 1906.
A. F. AHLSTRAND.
MACHINE FOR TIPPING CORSET STEELS.
APPLICATION FILED MAR. 17, 1906.

9 SHEETS—SHEET 1.

No. 830,555. PATENTED SEPT. 11, 1906.
A. F. AHLSTRAND.
MACHINE FOR TIPPING CORSET STEELS.
APPLICATION FILED MAR. 17, 1906.
9 SHEETS—SHEET 2.
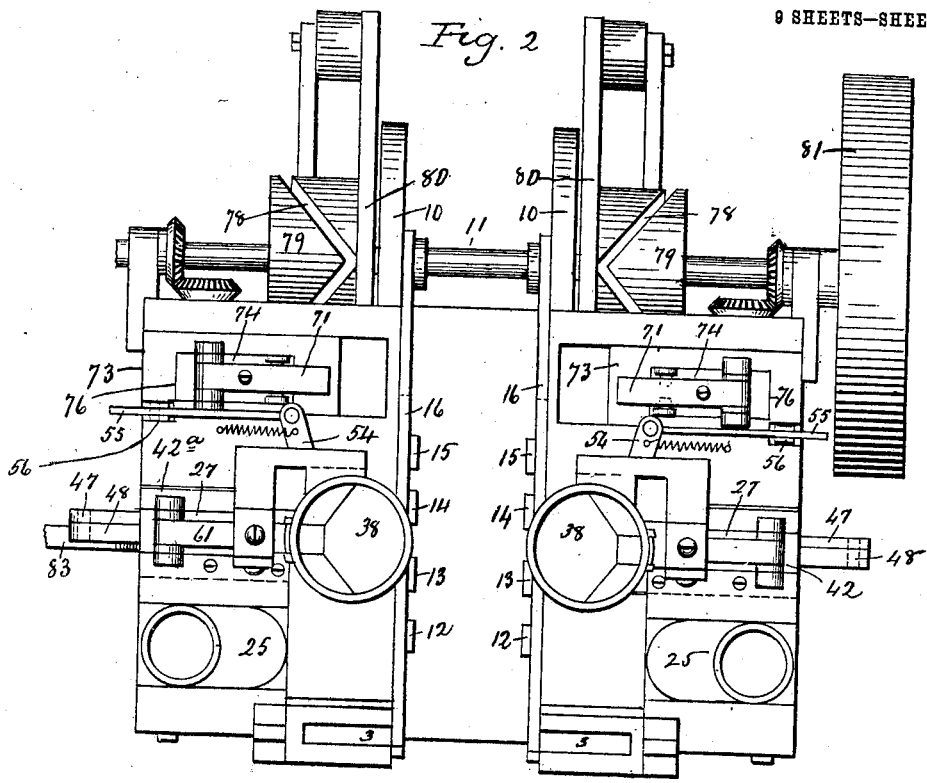

No. 830,555. PATENTED SEPT. 11, 1906.
A. F. AHLSTRAND.
MACHINE FOR TIPPING CORSET STEELS.
APPLICATION FILED MAR. 17, 1906.

9 SHEETS—SHEET 3.

No. 830,555. PATENTED SEPT. 11, 1906.
A. F. AHLSTRAND.
MACHINE FOR TIPPING CORSET STEELS.
APPLICATION FILED MAR. 17, 1906.

9 SHEETS—SHEET 4.

No. 830,555. PATENTED SEPT. 11, 1906.
A. F. AHLSTRAND.
MACHINE FOR TIPPING CORSET STEELS.
APPLICATION FILED MAR. 17, 1906.
9 SHEETS—SHEET 5.
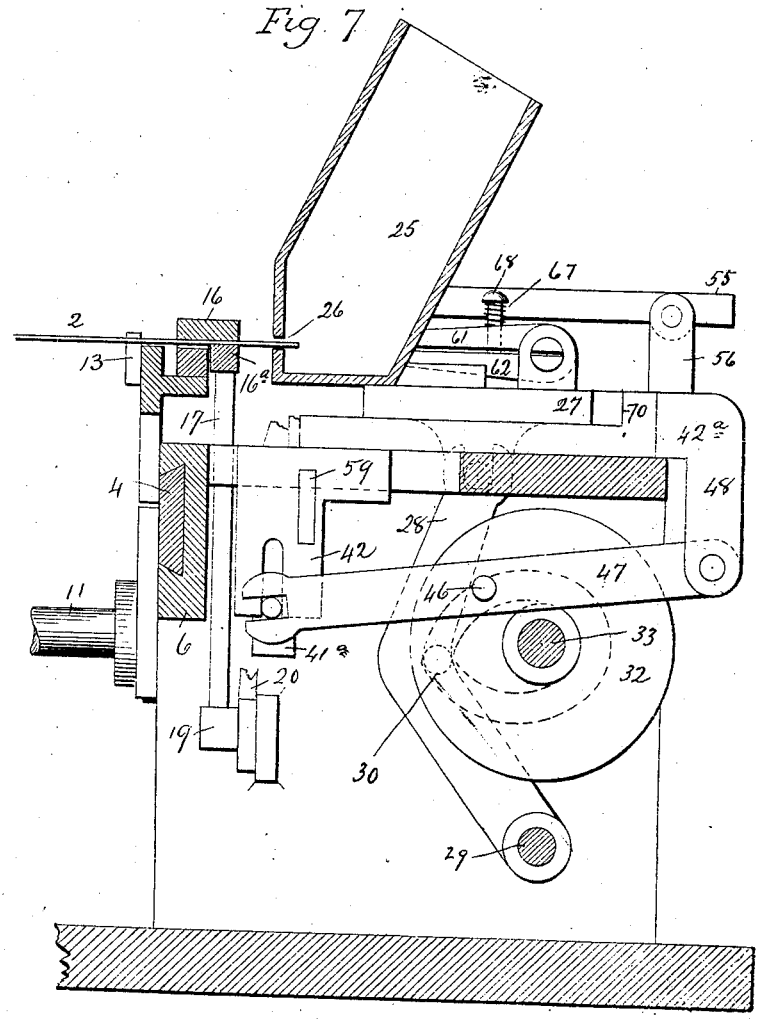

No. 830,555. PATENTED SEPT. 11, 1906.
A. F. AHLSTRAND.
MACHINE FOR TIPPING CORSET STEELS.
APPLICATION FILED MAR. 17, 1906.
9 SHEETS—SHEET 6.
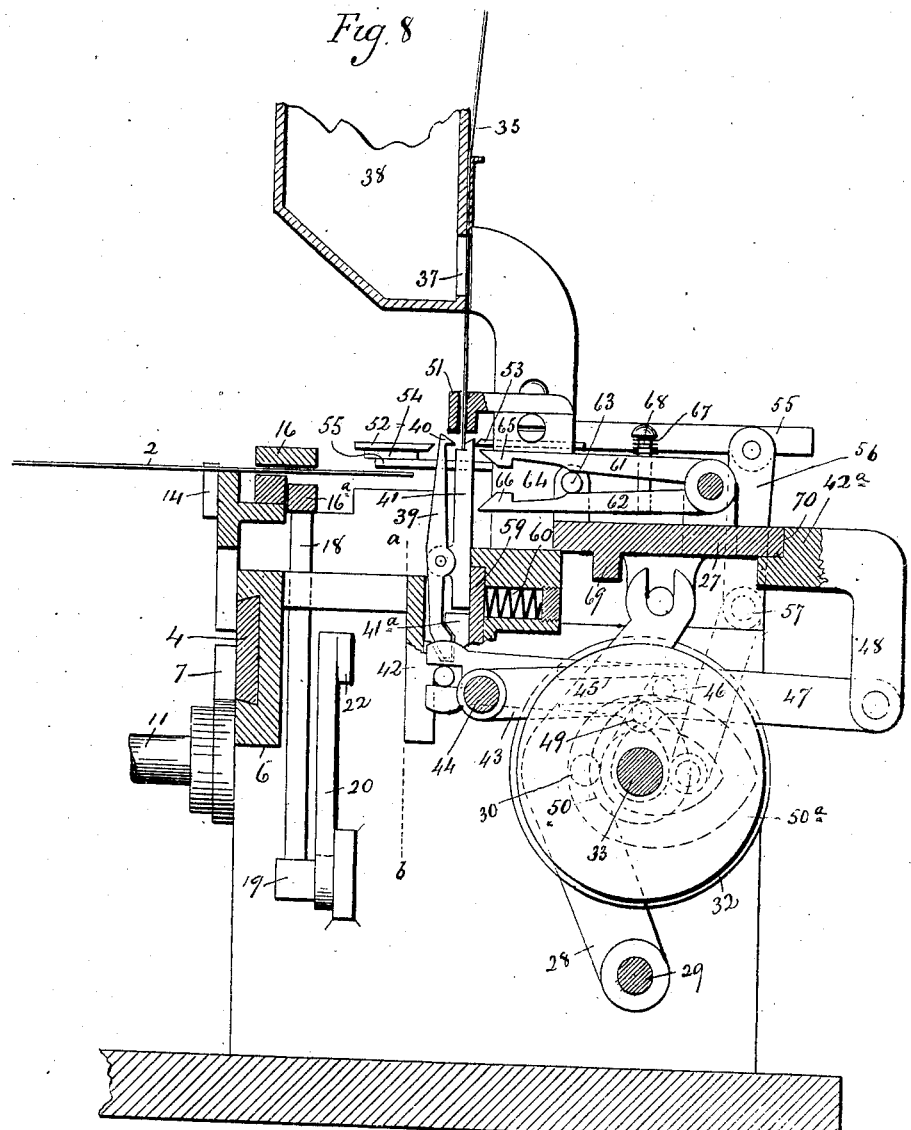

No. 830,555. PATENTED SEPT. 11, 1906.
A. F. AHLSTRAND.
MACHINE FOR TIPPING CORSET STEELS.
APPLICATION FILED MAR. 17, 1906.

9 SHEETS—SHEET 7.

No. 830,555. PATENTED SEPT. 11, 1906.
A. F. AHLSTRAND.
MACHINE FOR TIPPING CORSET STEELS.
APPLICATION FILED MAR. 17, 1906.
9 SHEETS—SHEET 8.
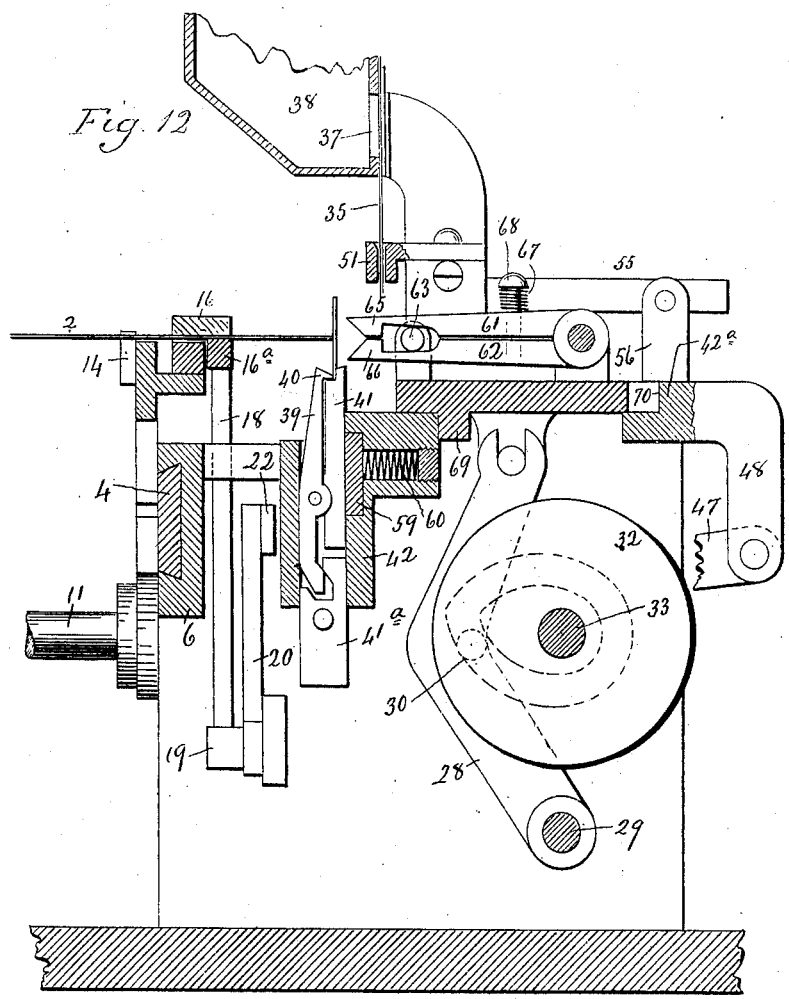
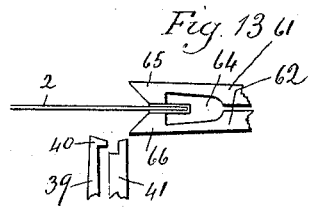

No. 830,555. PATENTED SEPT. 11, 1906.
A. F. AHLSTRAND.
MACHINE FOR TIPPING CORSET STEELS.
APPLICATION FILED MAR. 17, 1906.

9 SHEETS—SHEET 9.

UNITED STATES PATENT OFFICE.

AUGUST F. AHLSTRAND, OF BRIDGEPORT, CONNECTICUT, ASSIGNOR OF ONE-HALF TO THE CONNECTICUT CLASP CO., OF BRIDGEPORT, CONNECTICUT, A CORPORATION.

MACHINE FOR TIPPING CORSET-STEELS.

No. 830,555.    Specification of Letters Patent.    Patented Sept. 11, 1906.

Application filed March 17, 1906. Serial No. 306,486.

*To all whom it may concern:*

Be it known that I, AUGUST F. AHLSTRAND, a subject of the King of Sweden, residing at Bridgeport, in the county of Fairfield and State of Connecticut, have invented a new and useful Improvement in Machines for Tipping Corset-Steels; and I do hereby declare the following, when taken in connection with the accompanying drawings and the letters and figures of reference marked thereon, to be a full, clear, and exact description of the same, and which said drawings constitute part of this specification, and represent, in—

Figure 1:
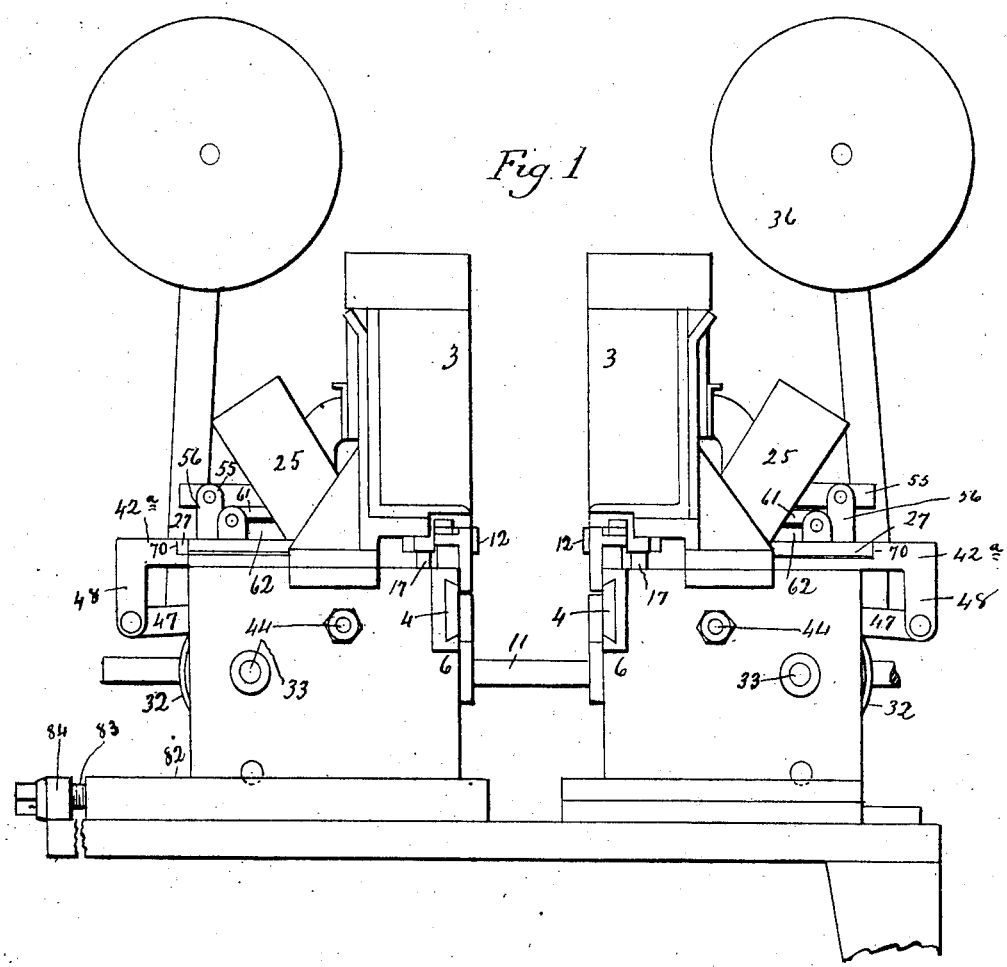
Figure 4:
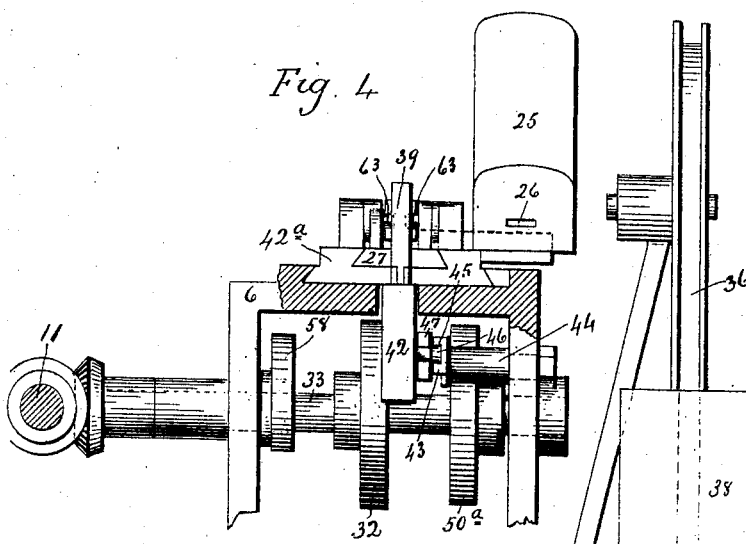
Figure 3:
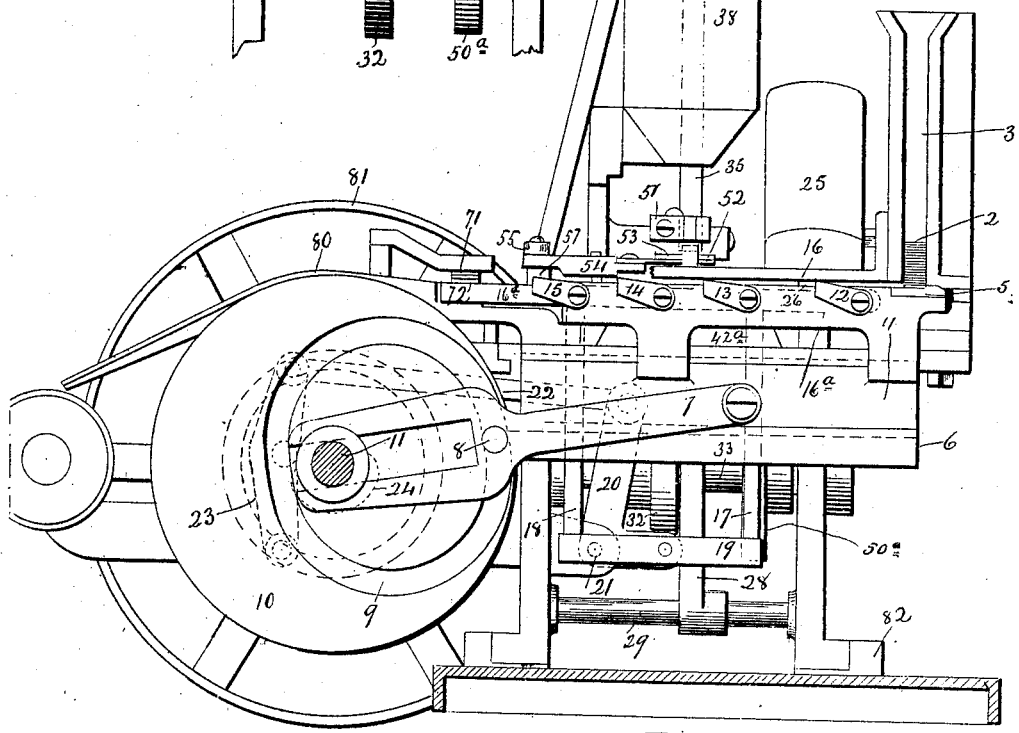
Figure 5:
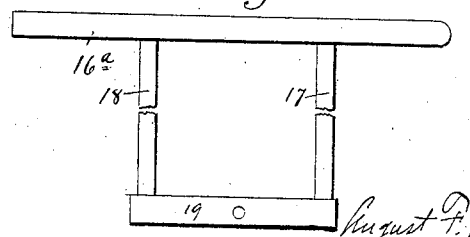
Figure 6:
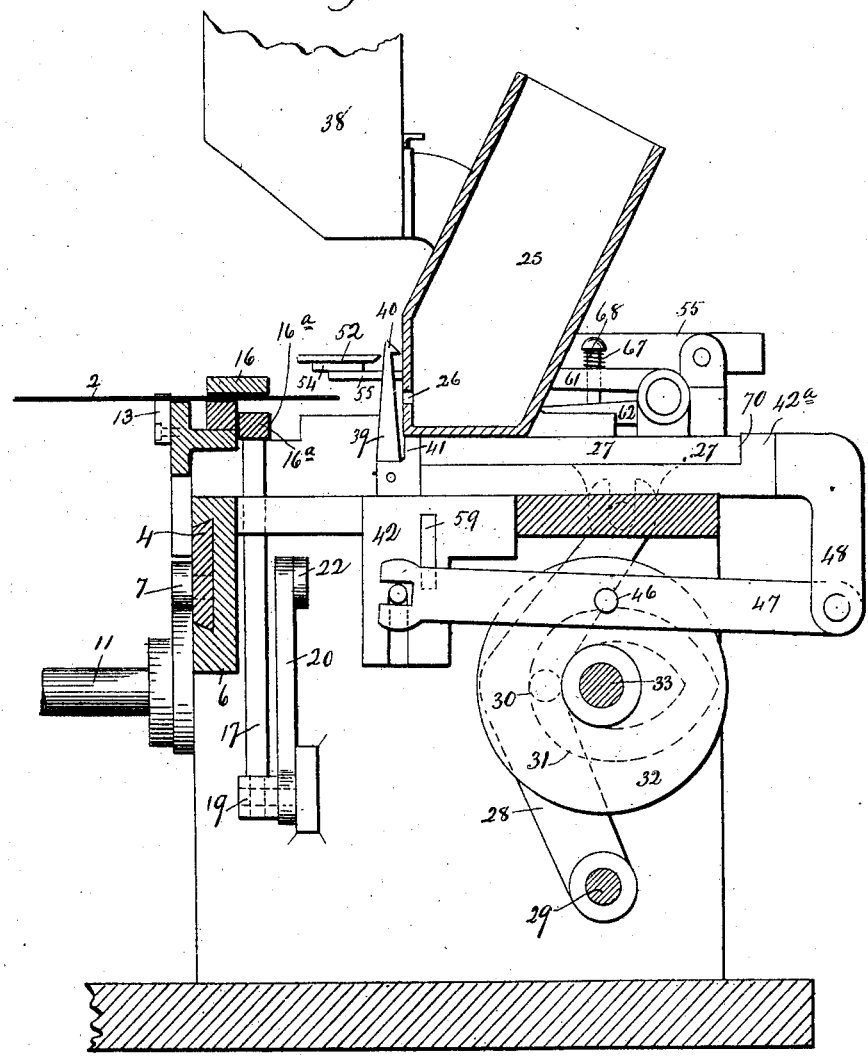
Figure 10:
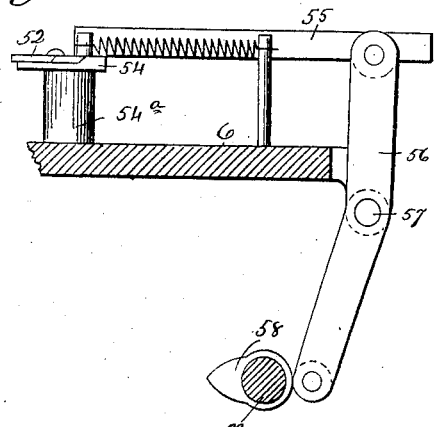
Figure 11:
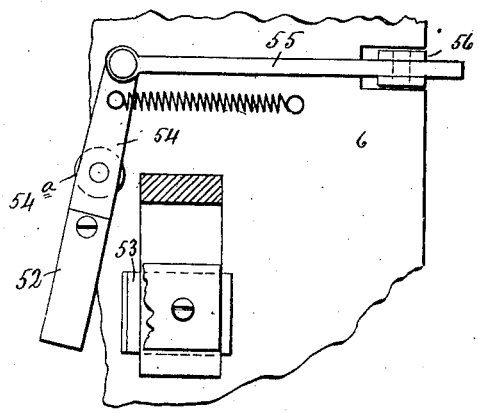
Figure 14:
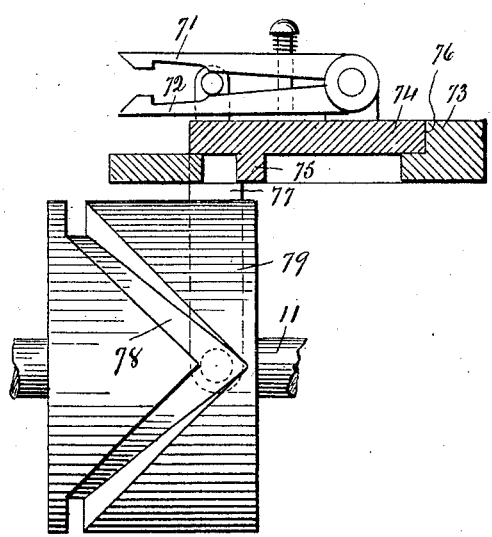
Figure 15:
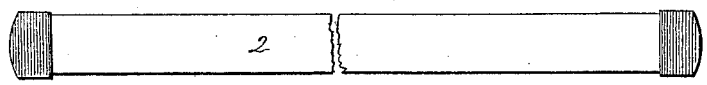

Figure 1, a front view of a machine constructed in accordance with my invention; Fig. 2, a top or plan view of the same; Fig. 3, a side view of the right-hand side of the machine; Fig. 4, a broken sectional view on the line $a\,b$ of Fig. 8; Fig. 5, a broken side view of the clamping-bar detached; Fig. 6, a broken section view illustrating the position of a steel preparatory to first pasting the end thereof; Fig. 7, a similar section showing the slide moved forward to primarily paste the steel; Fig. 8, a broken sectional view illustrating the mechanism for feeding a paper strip; Fig. 9, a broken sectional view showing a strip just as it is being cut; Fig. 10, a broken sectional view illustrating the means for operating the cutters; Fig. 11, a broken plan view of the same; Fig. 12, a view similar to the parts shown in Fig. 8, showing the severed tip at the end of the steel preparatory to being folded thereupon; Fig. 13, a broken sectional view showing a tip folded upon the steel; Fig. 14, a broken sectional view illustrating the final clamping or pressing jaws; Fig. 15, a broken plan view of a steel having tips applied thereto.

The ends of corset-steels as they come from a cutting-machine are liable to have a rough edge, which, after being placed in a corset, are liable to cut through the fabric. It is customary, therefore, to place upon the ends of these steels a short strip of cloth or paper, giving the ends a smooth edge, the material corresponding in width to the width of the steel. Various devices have been arranged for placing these tips on the steels; and the object of this invention is the arrangement of an automatic machine to take the steels one by one from a hopper, apply the tips of paper or cloth to the ends thereof, and discharge them in a finished condition; and the invention consists in the construction hereinafter described, and particularly recited in the claims.

The machine is built in two parts, so that, if desired, both ends of a steel may be simultaneously tipped; but only one side of a machine need be operated if it is desired to tip only one end of a steel, and for convenience of illustration I will describe one side of the machine together with such mechanism as may be necessary to connect the two parts.

The steels 2 are placed in a hopper 3 at the front of the machine, this hopper being of suitable form to properly hold the steels one above another. Below the hopper is a slide 4, carrying a hook 5, adapted to take the lowermost steel from the hopper and move it one step to the rear. The slide moves back and forth in the frame 6, the slide being operated by a lever 7, carrying a stud 8, which rides in a cam-groove 9 in a cam-wheel 10, mounted on a shaft 11. Also carried by the slide are a series of dogs 12, 13, 14, and 15, while above the slide 4 is a clamping-plate 16, below which and parallel therewith is a clamping-bar $16^a$, mounted at the upper end of two arms 17 and 18, which are connected by a brace 19 at the bottom, by which the clamping-bar is raised and lowered by means of a bell-crank lever 20, pivoted at 21 and having its upper end connected by a link 22 with a cam-arm 23, pivoted to the frame and operated by a cam 24 on the shaft 11.

In rear of the hopper 3 is a primary pasting-cup 25, having in its side near its bottom a slot 26, and this cup is mounted on a transversely-movable slide 27, operated by being connected with the upper end of an elbow cam-lever 28, pivoted at 29 and carrying a stud 30, which rides in a cam-groove 31 of a cam 32 on the shaft 33.

When the inward movement of the slide takes place, the first steel has been moved rearward by the hook 5 into line with the primary paste-cup 25, where it is clamped by the clamping-bar $16^a$ against the clamping-plate 16, so that as the cup moves forward it will pass onto the end of the steel which enters the slot 26 and receives a coating of paste. While the steel is thus engaged and being coated, the slide 4 moves forward for the hook 5 to engage with a second steel, while the dog 12 rises in front of the first steel and ready to advance it at the next step. At the next movement a second steel is fed to a point at the side of the primary paste-cup 25, while the first steel is advanced one step to a point in line with the strip of paper or fabric 35, fed from the roll 36, mounted above the frame, this strip passing down in front of an opening 37 in a paste-pot 38, also mounted above the bed of the machine and so that one face of the strip is coated with paste. Just below the position in line with the strip of fabric the lower end of the strip is gripped by a movable jaw 39, the upper end 40 of which clamps the end of the paper against a second jaw 41, these jaws being arranged to move vertically in a housing 42, forming part of a slide 42$^a$. The jaws 39 and 41 are raised and lowered by a cam-slide 41$^a$, moved by a short lever 43, mounted upon a stud 44, fixed to the frame and formed at its outer end with a groove 45, which sets over or rides upon a pin 46, mounted upon a link 47, which is connected with the cam-slide 41$^a$ and pivoted to an arm 48, depending from the slide 42$^a$, the lever 43 being raised and lowered by means of a pin 49, carried by it and riding in a cam-groove 50 on a cam 50$^a$ on the shaft 33. At the proper time the cam-slide 41$^a$ rises, and the end of the strip of paper or fabric 35 is grasped below a guide 51, through which it passes, having been coated, as before described, on one side with paste. The cam-slide then descends, drawing the strip with it across the end of the steel in line therewith, the steel being again held at this point by the clamping-bar 16$^a$ against the clamping-plate 16. When thus drawn downward, the end of the strip is severed by a blade 52, coacting with a stationary blade 53. The blade 52 is secured to a lever 54, which is mounted on a post 54$^a$, secured to the bed of the machine. The blade is moved back and forth by a lever 55, actuated through a link 56, pivoted at 57 to the bed of the machine and actuated at its lower end by a cam 58 on the shaft 33.

To prevent undue movement of the jaw 41, I arrange a friction-plate 59 adjacent to it and, by means of a spiral spring 60, hold the plate in contact with the jaw. The friction-plate also takes the wear upon the jaw 41 and prevents that jaw 41 wearing the adjacent part of the machine.

Two jaws 61 and 62 are arranged in line with the steel and are mounted upon the slide 42$^a$, while the slide 27 carries a pin 63, which passes between the jaws 61 and 62 and normally holds them open. The first movement of the slide 27 moves the pin from between the jaws into a clearance-space 64, arranged between them, allowing the extreme ends 65 and 66 to come together, the jaws being normally drawn together by a spiral spring 67, mounted upon a pin 68, passing through the jaw 61 into the jaw 62. Depending from the slide 27 is a lug 69, which rides in a slot in the slide 42$^a$ and by the continued movement of the slide 27 moves the slide 42$^a$, which is moved in the opposite direction by the engagement of the end of the slide 27 with a shoulder 70 on the slide 42$^a$. This forward movement of the slides 27 and 42$^a$ moves the jaws against the severed strip of paper and carries it over the end of the steel, folding it down on the opposite sides thereof, as shown in Fig. 13. The next movement of the slide advances the two steels thus acted upon and feeds a third one from the hopper to the primary pasting-cup, the covered steel being advanced by the dog 13 to a point in front of the dog 14 and at the next step is brought into line with final pressure-jaws 71 and 72, corresponding in form to the jaws 61 and 62 and carried by a slide 73, which is operated by a slide 74, having a lug 75 on its under side to strike the slide 73 to move it forward, while the end of the slide 74, striking a shoulder 76, moves the slide 73 backward, the slide 74 being operated by a lever 77, actuated by a cam-groove 78 on a cam 79 on the shaft 11, which is geared to the shaft 33. As the jaws 71 and 72 advance they close together and press the paper or fabric which has been pasted to the end of the steel, the pressure of the jaws being somewhat greater than the pressure of the jaws 61 and 62, so as to give it more of a squeezing or pressing effect and secure better adhesion. When these jaws retire to release the steel, it is delivered onto a belt 80, by which it is carried to a suitable receptacle. (Not shown.)

The two sides of the machine are operated by the shaft 11, which is driven by a main pulley 81. In order to accommodate steels of different lengths or when only one end of the steel is to be tipped, the frame at the left of the machine is arranged to slide upon a bed 82 and be moved thereon by a screw-shaft 83, which is held against longitudinal movement by a lug 84, through which it passes, and which has threaded engagement with the frame, so that by turning the screw in one direction or the other the left-hand frame is moved toward or from the right-hand frame.

I claim—

1. In a machine for tipping steels, means for feeding the steels step by step, a primary pasting-cup, and means for moving it forward over the end of the steel, a tipping-strip, means for cutting the same at predetermined lengths, and jaws for folding the tip over the end of the steel, substantially as described.

2. In a machine for tipping steels, a slide carrying a series of dogs and adapted to feed steels one by one, means for clamping the steels at predetermined positions, a primary pasting-cup arranged to be moved over the end of the steels, a tipping-strip, means for drawing the same into line with the end of a steel, means for severing the end of said strip, and jaws adapted to force said tip over the end of the steel, substantially as described.

3. In a machine for tipping steels comprising a hopper in which the steels are arranged one above the other, a slide arranged beneath said hopper and formed with a hook to remove one steel at a time from the bottom of the hopper, dogs carried by said slide, a clamping-bar arranged in connection with the frame for holding the steels fed at predetermined positions, a primary pasting-cup mounted upon a slide and formed with a slot adapting it to be passed over the end of a steel, a strip of tipping material, means for drawing the same into line with the end of the steel, and means for severing the end of the strip, and spring-jaws adapted to fold said strip over the end of the steel and a second pair of jaws adapted to subsequently press the tip upon the steel, substantially as described.

4. In a machine for tipping steels comprising a frame, a slide movable therein and adapted to feed steels step by step, a slide carrying a primary pasting-hopper formed with a slot adapting it to be passed over the end of a steel held beyond it, a strip of tipping material, jaws adapted to be raised to grip the end of said strip and draw the same downward, a pasting-hopper having an opening through which the paste is exposed and over which one face of the said strip passes, cutters for severing the end of said strip, a slide carrying spring-jaws, means for moving said slides forward whereby the jaws are carried over the end of the steel and fold the tip thereupon, a second pair of jaws for pressing the tip thus applied, and cams and levers for performing said operations simultaneously, substantially as described.

In testimony whereof I have signed this specification in the presence of two subscribing witnesses.

AUGUST F. AHLSTRAND.

Witnesses:
ALFRED J. EAGEN,
W. S. CORNWELL.